Patented Apr. 8, 1930

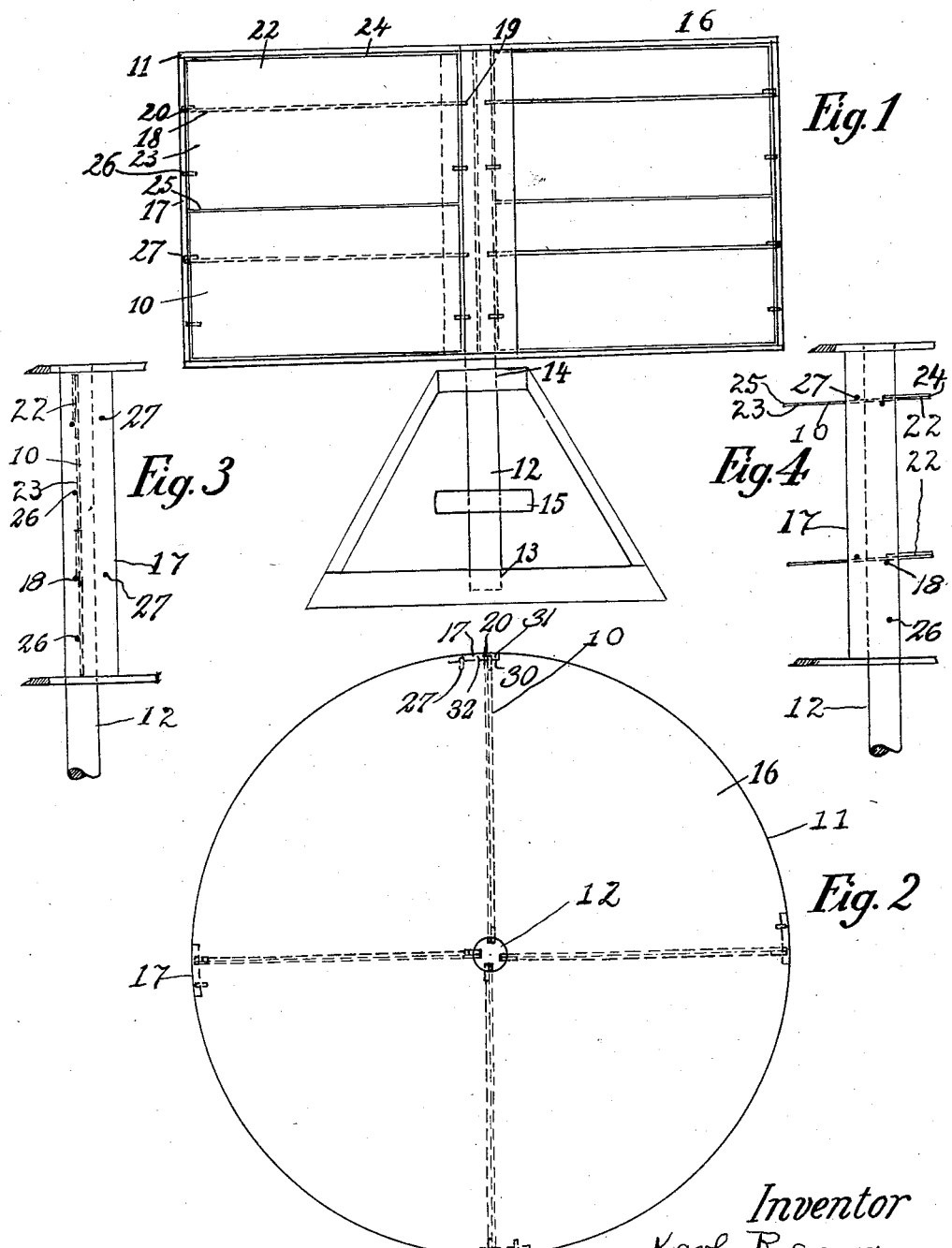

1,753,302

UNITED STATES PATENT OFFICE

KARL RAMM, OF NEW BRITAIN, CONNECTICUT

WIND ROTOR

Application filed September 21, 1926. Serial No. 136,824.

My invention relates to improvements in wind rotors of the form having vanes supported by a vertical shaft for utilizing the force of wind currents for useful power, and the object of my improvement is to produce a wind rotor of relatively simple form, that is economical to build, and that is convenient and efficient under conditions of use.

In the accompanying drawing:—

Figure 1 is a front elevation of my improved wind rotor, the bearings and supports and power transmission details being shown in diagrammatic form.

Figure 2 is a plan view of the same, certain details being shown by broken lines.

Figure 3 is an end elevation as viewed from the left end in Fig. 1.

Figure 4 is an end elevation as viewed from the other end.

My improved wind rotor comprises a set of vanes 10 that are contained in a shell-like housing 11 and which vanes and housing are supported by means of a vertical shaft 12.

The shaft 12 may be supported in any proper manner by means of suitable bearings. Thus there may be a step bearing 13 in which the lower end of said shaft 12 is seated and a guide bearing 14 adjacent the under side of the housing 11.

Between said bearings there may be a pulley 15 mounted on the shaft 12 for the transmission of power.

The housing 11 is rigidly secured to the upper end portion of the shaft 12 so as to rotate therewith.

The structure of the housing 11 comprises similar top and bottom plates 16 of circular form and these are inter-connected at the edges and at ninety degree intervals by the vertical struts 17 and which, as shown, are each in the form of a narrow plate of sheet metal, located generally tangential.

The vanes 10 swing to a limited extent on horizontal shafts, the movement being limited by means of stop pins for each direction of movement, and such pins and the outer ends of the shafts are supported by the struts 17.

In an elementary structure there would be one vane for each strut, making a set of four vanes. In the case of a practicable structure, however, there may be a plurality of such sets of vanes arranged in a single housing.

The structure shown may be designated as a two storied affair, having two sets of vanes in the one housing.

The vanes are all alike and are individually mounted on a shaft 18; the inner end 19 of said shaft 18 being entered into a suitable opening in the main vertical shaft 12; and the outer end 20 being entered into a suitable opening in the strut 17.

Each vane 10 has a depth such as to fill one-half the space between the top and bottom plates 16, and when in the vertical position receives the full blast or pushing effect of the available wind force, such varying as the movable structure, composed of the housing 11, the vanes 10, and the vertical main shaft 12, rotates and the angular relation to the direction of the wind changes.

In order to utilize such wind force the vanes are retained in such vertical position by the following devices:—The shaft 18 is located above the center of the vane 10. As shown, said shaft 18 is located so as to subdivide the vane 10 into an upper part 22 and a lower part 23 and said upper part 22 has one-half the area of said lower part 23. That is to say, the shaft 18 is located at the one-third distance downwardly from the top edge 24 toward the bottom edge 25.

Therefore, the lower part 23 sustains about twice the wind pressure as the upper part 22, and, if free to do so the vane would be rotated by the extra or surplusage of pressure on the lower part 23. This tendency to rotate the vanes is resisted by means of a set of fixed pins 26 when the vanes are in the active useful position for cooperating with the wind. When turned from such position the vanes are allowed to swing on their shafts 18 to a substantially horizontal position and such tilting is limited by means of other back-stop pins 27.

It is desirable to have the wings 10 substantially balanced and this end may be obtained in any proper manner.

One manner of doing this is shown and involves making the upper part 22 of double thickness. As to details, such double thickness may be obtained by having a sheet of proper length bent back upon itself. Thus, the top edge 24 would be in the form of a return bend that connects the two layers of which the top part 22 is composed.

The strut 17 supports the outer vane pintle end 20 and incidental thereto the strut structure would be expected to overhang the adjacent portion of the vane 10 when in the vertical position so as to provide a corner structure that on the active wind-resisting side would operate as a pocket for the wind or air and thus enhance the wind effect on the vane. That is to say, in providing material for the strut for the necessary mechanical strength something in the way of a pocket would be provided. This condition is illustrated by the corner 30 that is formed in cooperation with the adjacent vane 10 by the back part 31 of the strut 17, as best shown in Fig. 2, said back part 31 being the part that is at the rear of the vane as related to the direction of the wind and which while of appreciable extent is actually relatively short.

In the case of the front part 32 of the strut 17 it will be noted that this is several times greater than the rear or back part 31, involving an extension of the strut structure for the purpose of enhancing the pocket effect.

The extended front part 32 likewise is utilized for the support for the stops 27 for the adjacent vanes 10 that check the vane movement in the horizontal position, thus permitting said stops 27 to be located more remote from the vane axis than would be possible without such extension or some special structure.

I claim as my invention:—

1. In a wind rotor, a vane mounted for swinging between the vertical wind-resisting position and the horizontal inactive position and having a supporting pintle at the outer end, a strut structure opposed to the outer edge portion of said vane and provided with a bearing for said pintle, the part of said strut structure on the wind or air pressure contacting face of said vane being relatively extended for the purpose of enhancing the wind or air pocket effect of the strut structure in cooperation with the adjacent edge portion of the vane.

2. In a wind rotor as described in claim 1, a stop for limiting the swinging movement of the vane, said stop being supported by such extended portion of the strut structure.

3. In a wind rotor, a vane made of a single piece of sheet material of rectangular form, provided with an axial support that extends across the sheet at the middle thereof, the half-sheet on one side of said axis comprising two parts that are connected by a return-bend portion at substantially the middle of said half sheet that is in parallelism with said axis, so as to provide a double thickness with a corresponding reduction of area for exposure to air pressure for the said half sheet.

KARL RAMM.